March 4, 1958 A. BURI 2,825,306
SERVOMOTOR CONTROL SYSTEM
Filed Feb. 9, 1955 3 Sheets-Sheet 1

INVENTOR.
ALFRED BURI.
BY
K. B. Mayr
ATTORNEY.

INVENTOR.
ALFRED BURI.
BY
K. A. Mayr
ATTORNEY.

INVENTOR.
ALFRED BURI.

2,825,306
SERVOMOTOR CONTROL SYSTEM

Alfred Buri, Winterthur, Switzerland, assignor to Sulzer Freres, Societe Anonyme, Winterthur, Switzerland, a corporation of Switzerland Application February 9, 1955, Serial No. 487,137
Claims priority, application Switzerland February 10, 1954

10 Claims. (Cl. 121—38)

The present invention relates to a servomotor control system, for example, for remotely controlling a fluid flow control device, for example a valve, which must automatically perform a safety function in response to at least one physical condition of the fluid whose flow is controlled by the flow control device, irrespective of the action of the remotely controlled adjustment.

The object of the safety function is to actuate the flow control means in response to an operating condition, or cnditions to prevent or forestall a dangerous condition. The mechanism according to the invention prevents actuation of the flow control means in a direction opposite to that required to perform the safety function within predetermined limits of the conditions to which the safety function responds, which limits may be set, for example, by remote control from a central control station. The safety function requires actuation of the flow control means always in the same direction, even if the safety function is responsive to a plurality of different operating conditions, such as pressure and temperature of the fluid whose flow is controlled by the flow control means.

Control systems with which the present invention is concerned are used, for example, to set flow control means in steam power plants in desired operating positions from a central control station, whereby the operation of the flow control means in the direction of the safety function, for example immediate closing upon a drop of pressure or temperature of the fluid whose flow is controlled below a predetermined pressure, must not under any circumstances be impeded and must be safeguarded against any adverse manipulation in the control station. This complete independence is assured only if all influences tending to operate the flow control means in a direction opposite to its safety function are definitely prevented as soon as an operating condition exists which tends to actuate the flow control means in the direction of its safety function.

The control mechanism or system according to the invention includes a main control conduit for conducting hydraulic, electric, or other impulses for operating a servomotor for actuating the flow control means from an impulse adjusting or generating device for actuating the flow control means in a direction opposite to its safety function, an adjustable means for remote operation of the servomotor for actuating the flow control means in the direction of its safety function, and an adjusting means responsive to an operating condition essential for the safety of the plant to which the flow control means contributes, the last-mentioned adjusting means being interposed in and adapted to disconnect the control conduit from the first-mentioned adjustable means and to transmit through the control conduit only such impulses as are adapted to operate the servomotor for actuation of the flow control means in the direction of the safety function. The system according to the invention has only one control conduit which can be interrupted by the adjusting means which are responsive to operating conditions which must be maintained under all circumstances, whereby other adjustable means connected with the control conduit are prevented from having any effect on the operation of the servomotoor when the adjusting means which are responsive to operating conditions responsible for the safety of the plant respond to such conditions and feed impulses to the servomotor for actuating the flow control means in the direction of its safety function.

The adjusting means which effect remote control of the flow control means to perform its safety function, and which will henceforth be called the second control means, may be located at various points of the control system without impairing the advantages according to the invention. The adjusting device for operating the servomotor to actuate the flow control means in a direction opposite to its safety function, which will henceforth be called the first control means, and the second control means may have a common adjusting means adapted to be set into two operating positions and into one rest position. The second control means may be interposed at any point of the control conduit as may be a third control means which interrupts the control conduit for transmission of control pulses of the first control means and causes pulses like the second control means. The second control means may be arranged in a branch conduit extending from the main control conduit. The second and third control means may form a unit, so that both have an adjusting means in common which responds to at least one operating condition, such as pressure or temperature, and which effects the remote control of the flow control means.

In many cases it is of advantage to provide a single adjusting means for the third control means, which adjusting means is adapted to respond to all operating conditions which must cause the fluid flow control means to perform its safety function. As a modification, the third control means may be provided with a plurality of individual adjusting means arranged in series in the control conduit, each adjusting means being responsive to a different operating condition. The control device interposed in the control conduit closest to the servomotor has priority over all other control devices interposed in the control conduit, the priority of the other devices relatively to each other being proportional to their proximity to the servomotor. All devices in the control conduit which are farther from the servomotor than the particular device which is actuated at a given moment, are rendered ineffective by the actuated device. The different priorities of the individual adjusting or control means are of interest only in systems in which the safety function of the flow control means must be effected in a different manner, for example at different speeds, in response to different operating conditions. If such differentiation is not required, the sequence of the adjusting means in the control conduit is unimportant.

The control system according to the invention may be operated by a pressure fluid or it may, at least in part, be electrically operated. Any suitable combination of these two operating agents may be employed, or one or both agents may be combined with other operating agents.

The servomotor for actuating the fluid flow control means may be provided with a return guide and the first control means may include a resilient element, for example a spring, which may be pretensioned and which may act on a piston, so that a predetermined pressure is maintained in the control conduit. Each adjusted pretension of the spring corresponds to a certain position of the flow control means, so long as the second and third control means are not actuated. The position of the flow control means is indicated by the adjustment of the spring, at least during normal operation. Otherwise, special indicating means must be provided for reporting the position of the flow control means or the amount of fluid passed by the flow control means. This arrangement affords also that the third control means causes not only a safety function but also operates as a regulating means, within the range which is covered by the safety function, by automatically returning the flow control means into the position defined by the first control means after termination of the actuation by the third control means.

The novel features which are considered characteristic of the invention are set forth with particularity in the appended claims. The invention itself however and additional objects and advantages thereof will best be understood from the following description of embodiments thereof when read in conjunction with the accompanying drawing, in which Fig. 1 is a simplified diagram illustrating a control arrangement according to the invention;

The same numerals designate the same parts in all figures.

Figure 1:
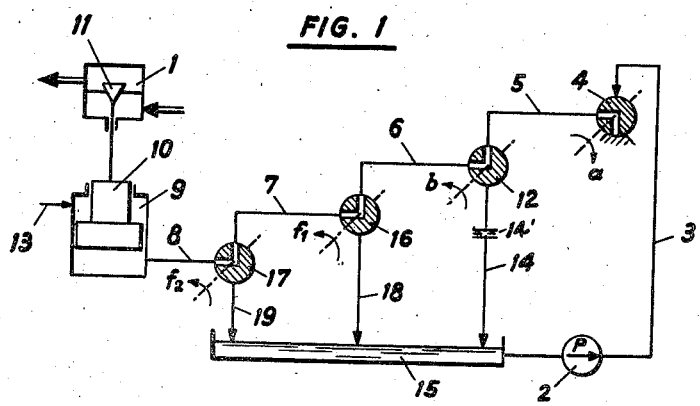

Referring more particularly to Fig. 1 of the drawing, numeral 1 designates a flow control means or valve which must be opened and closed and held in any desired position by remote control. The flow control means 1 must perform a safety function which consists in closing the flow control means. A pump 2 supplies a control fluid through a conduit 3 to a first control means 4. If the control device 4 is rotated in the direction of the arrow $a$, for example, by remote control from a central control station, pressure fluid can flow from the conduit 3 through conduit sections 5, 6, 7, and 8 of a main control conduit into a servomotor 9 which includes a piston 10 connected to a valve member 11 of the flow control means 1. Supply of pressure fluid to the servomotor 9 causes lifting of the valve 11 and opening of the flow control means. The first control means 4 thus operates the servomotor 9 and actuates the valve 11 in a direction which is opposite to the direction of its safety function. If the control device 4 is returned to its original position by counterclockwise rotation, the valve 11 will remain in its adjusted position. Numeral 12 designates a second control means or device which is adapted to be rotated by remote control in the direction of arrow $b$. If it is rotated through 90° from the position shown, pressure fluid will flow from the servomotor 9 through conduits 8, 7, 6, and 14 into a reservoir 15, so that pressure fluid supplied to the servomotor through a conduit 13 pushes the piston 10 downward, closing the valve 1 wholly or partially, depending on the duration of the connection of conduits 6 and 14 afforded by the device 12. A third control means includes two control devices 16 and 17, which are adapted to be actuated by impulses produced by a physical condition, such as pressure or temperature, of the fluid whose flow is controlled by the flow control means 1. Separate devices 16 and 17 are shown in the diagrammatic illustration, Fig. 1. These devices, however, may be combined into a single (third) control means similarly to the combination of the second and third control means which form a single device 20 in the system shown in Fig. 2 which will be described later. If the devices 16 and 17 are rotated in the direction of the arrows $f_1$ and $f_2$, respectively, pressure fluid can flow from the servomotor 9 through conduits 8, 7, and 18, or 8 and 19, into the container 15. The valve 11 is thereby closed in the same manner as it may be closed upon rotation of the device 12 in the direction of the arrow $b$, irrespective of the position of the devices 4 and 12.

Figure 2:
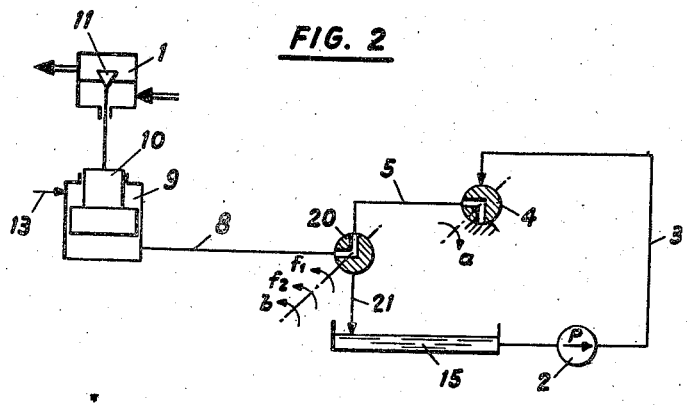
Fig. 2 is a simplified diagram illustrating a modified control arrangement according to the invention.

In the simplified arrangement illustrated in Fig. 2, the valve 11 can be opened by means of a first control means 4 in the same manner as is the case in the arrangement according to Fig. 1. The second and third control means which actuate the valve in the direction of its safety function, are combined into a single device 20, which may be rotated in the direction of arrow $b$ by remote control from a control station, and which may be rotated in the direction of the arrows $f_1$ and $f_2$ in response to physical conditions, such as pressure or temperature, of the fluid whose flow is controlled by the valve 1. Three solenoids may be provided which have a common armature, to which the device 20 is connected, one of the solenoids being energized, for example, by closing a switch in a control station, and the other two solenoids may be individually energized by electric current controlled by switches which are operated in response to a physical condition, such as pressure and temperature, of the fluid whose flow is controlled by the valve 1. If the device 20 is rotated through 90° from the position shown in Fig. 2, pressure fluid can flow from the servomotor 9 through the conduit section 8 and a conduit 21 into the container 15, so that the valve 11 is closed by the action of a pressure fluid supplied through a conduit 13 to the servomotor 9.

Whereas in the modification shown in Fig. 2 the effect of the control impulses producing rotation of the device 20 in the direction of the arrows $b$, $f_1$ and $f_2$ are exactly the same, in the modification shown in Fig. 1 the device 17 has priority over the devices 16 and 12, because, if the device 17 is actuated, the devices 16 and 12 are rendered ineffective. This is of importance only if the effect of the individual devices 12, 16, and 17 on the operation of the servomotor 9 is different, for example, if one of the relief conduits 14, 18, and 19 is provided with a throttling device, so that it delays the closing speed of the valve 1 relatively to the closing speed produced by the other devices. Preferably, the control device nearest to the control device 4 is provided with a delaying device, such as an orifice plate 14', as is indicated in Fig. 1 in the relief conduit 14, which is controlled by the second control means 12.

Figure 3:
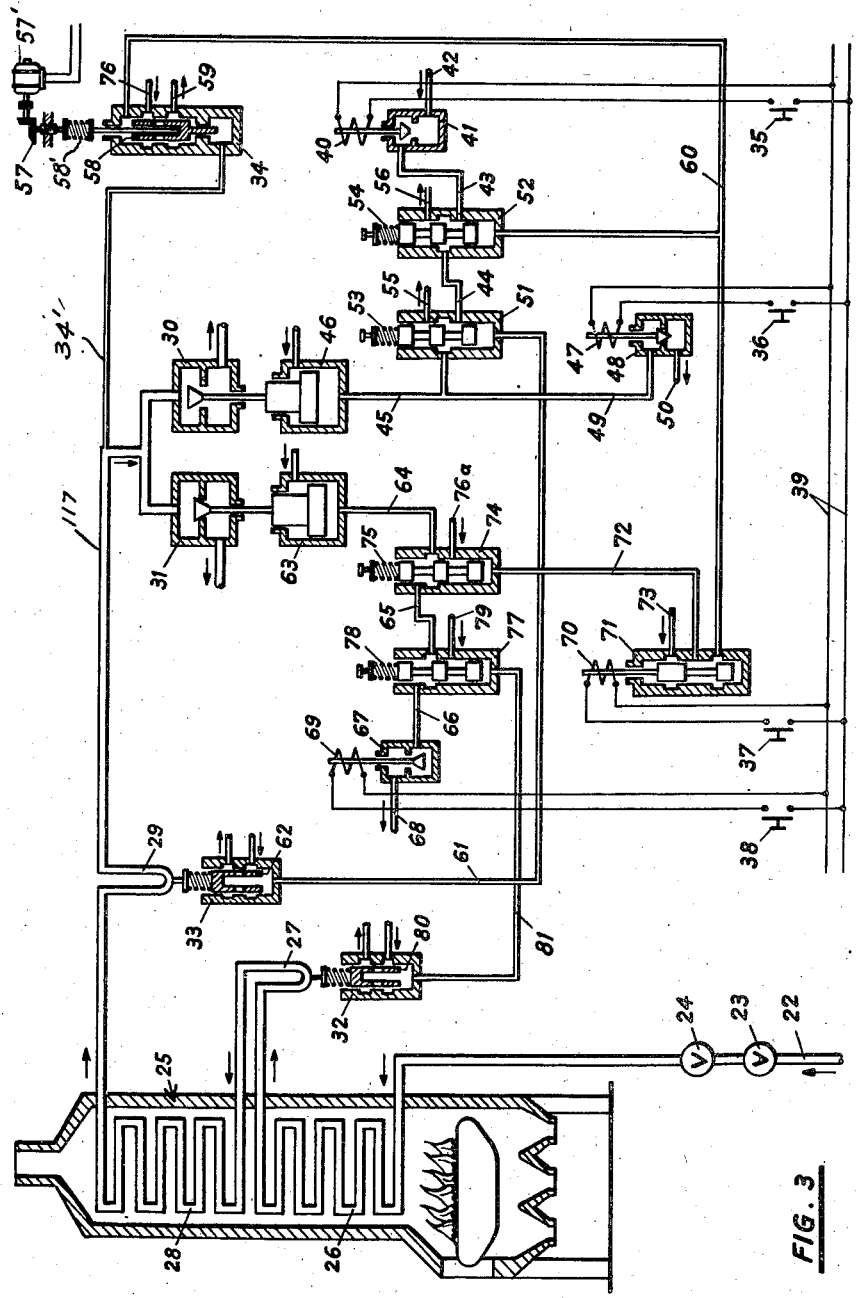
Fig. 3 is a diagrammatic illustration of a portion of a steam power plant equipped with a control mechanism according to the invention.

Fig. 3 illustrates a portion of a steam power plant. Feed water is supplied through a conduit 22, through a differential pressure valve 23, and through a feed water valve 24 to an evaporating heating surface section 26 of a steam generator 25. The operating medium which is mostly steam, flows from the section 26 through a first thermostat 27 into a superheater 28 and therefrom through a second thermostat 29 and through a steam main 117 either through a steam valve 30 into a prime mover, not shown, or through a by-pass valve 31 back into the circuit of the operating medium without flowing through the prime mover, i. e., by-passing the latter.

The steam valve 30 and the by-pass valve 31 must both be operated from a central control station by remote control. The steam valve must close immediately, if the steam pressure upstream of the valve falls below a predetermined pressure, for example 95% of the normal steam pressure, or if the temperature of the superheated steam is reduced to below a predetermined value. The steam valve 30 must be closed in order to perform its safety function and the by-pass valve 31 must be opened in order to perform its safety function.

The control impulses which cause the valves to perform their safety functions are produced by means of a temperature impulse generator 32 connected with the thermostat 27, by means of a temperature impulse generator 33 connected with the thermostat 29, and by means of a pressure impulse generator 34 which is connected to the steam main 117 by a conduit 34' upstream of the valves 30 and 31. For remote control of the valves 30 and 31, switches 35, 36, 37, and 38 are provided in the central control station for selectively energizing solenoids 40, 47, 70, and 69 by connection to a source of electricity 39.

In order to open the steam valve 30, the switch 35 is closed, so that the solenoid 40 is energized and opens a valve 41, which is the first control means, for permitting a pressure fluid supplied by conduit 42 to flow into a main control conduit including sections 43, 44, and 45, and into a servomotor 46 for opening the steam valve 30 which is connected with the servomotor 46 for actuation thereby.

If it is desired to close the valve 30, the switch 36 is closed, so that the solenoid 47 is energized and opens a valve 48, which is the second control means, to relieve pressure fluid from the servomotor 46 through a conduit 49 branching from the main control conduit 45, and through a discharge conduit 50.

The third control means includes two slide valves 51 and 52. The valve 51 is moved upward, if the pressure fluid in a conduit 61, which is controlled by the temperature impulse generator 33 and acts on one end of the valve 51, exceeds the pressure of a spring 53 acting on the other end of the valve 51. Upward movement of the valve 51 produces connection of the conduit 45 with a relief conduit 55, so that pressure fluid is removed from the servomotor 46 and the valve 30 is closed. Similarly, the valve 52 is moved upward, if the pressure in the conduit 60, which pressure is controlled by the pressure impulse generator 34 and acts on one end of the valve 52, exceeds the pressure produced by a spring 54 at the other end of the valve 52. Upward movement of the valve 52 connects the conduits 45 and 44 with a relief conduit 56, so that pressure fluid is removed from the servomotor 46 and the valve 30 is closed. The tension of the springs 53 and 54 can be adjusted by conventional means, not shown.

If the steam pressure upstream of the valve 30 falls below a pressure which is determined by the adjustment of the tension of a spring 58' acting on one end of a piston valve 58 forming part of the pressure impulse generator 34, pressure fluid escapes through a discharge conduit 59, and the fluid pressure in the impulse-transmitting conduit 60 is reduced, so that the slide valve 52 moves downward and connects the control conduit section 44 with a discharge conduit 56. This causes movement of the valve 30 in the direction of its safety function, i. e. closes the valve 30. If the steam pressure exceeds the pressure produced by the spring 58', the piston 58 will be moved upward, so that pressure fluid supplied by a conduit 76 will flow into the conduit 60 and force the slide valve 52 upward whereby the control mechanism assumes the position shown in Fig. 3. The tension of the spring 58' can be adjusted by remote control, which effects operation of a motor 57' rotating gears 57.

Likewise, the valve 30 is closed, if the pressure in a conduit 61 falls because the temperature acting on the thermostat 29 has fallen below a predetermined value and has lifted the valve 62, so that pressure fluid is relieved from the conduit 61 through the adjusting means 33. Reduced pressure in the conduit 61 permits a spring 53 to move the slide valve 51 downward, closing the conduit 44 and allowing pressure fluid to escape from the conduit 45 through a discharge conduit 55, so that the valve 30 is closed.

The by-pass valve 31 is normally closed. Should it have been opened and pressure fluid can flow from the servomotor 63 through a control conduit comprising sections 64, 65, and 66, and through a first control means 67 into a discharge conduit 68, the valve 31 will be closed again. If it is desired to maintain the valve 31 in a certain position, a switch 38, which is in a control station, is closed, so that a solenoid 69 is energized and the valve 67 is closed. If it is desired to open the valve 31 farther, a switch 37 is closed, energizing a solenoid 70 for lifting a valve 71 which connects a control conduit 72 with a pressure fluid supply conduit 73. The pressure fluid lifts the valve 74 against the action of a spring 75, so that pressure fluid flows from a supply conduit 76a into the servomotor 63, whereby the valve 31, which is connected with the servomotor for actuation thereby, is opened. If the solenoid 70 is not energized, control impulses can be transmitted from the impulse generator 34 through the conduits 60 and 72 to the control valve 74.

The by-pass valve 31 is moved in the direction of its safety function, i. e. it is opened, when the valve 58 is moved upward by excessive pressure transmitted to the impulse generator 34 from the steam main 117. This causes flow of pressure fluid from the supply conduit 76 into the conduit 60.

The valve 77 is lifted against the action of a spring 78, if the temperature measured by the thermostat 27 rises so much that the piston 80 of the temperature impulse generator 32 is moved downward, causing pressure fluid to be supplied to the conduit 81. Upward movement of the valve 77 affords flow of pressure fluid from a supply conduit 79, through the control conduit sections 65 and 64, into the servomotor 63 for opening the valve 31. The valves 74 and 77 form the third control means and are arranged in series in the control conduit, the valve 74 being combined with the second control means 71, so that the valve 74 can be manually controlled from the central control station (switch 37) and can transmit impulses caused by physical conditions (pressure acting on device 34 and temperature acting on device 32) of the fluid whose flow is controlled by the flow control means 31.

Figure 4:
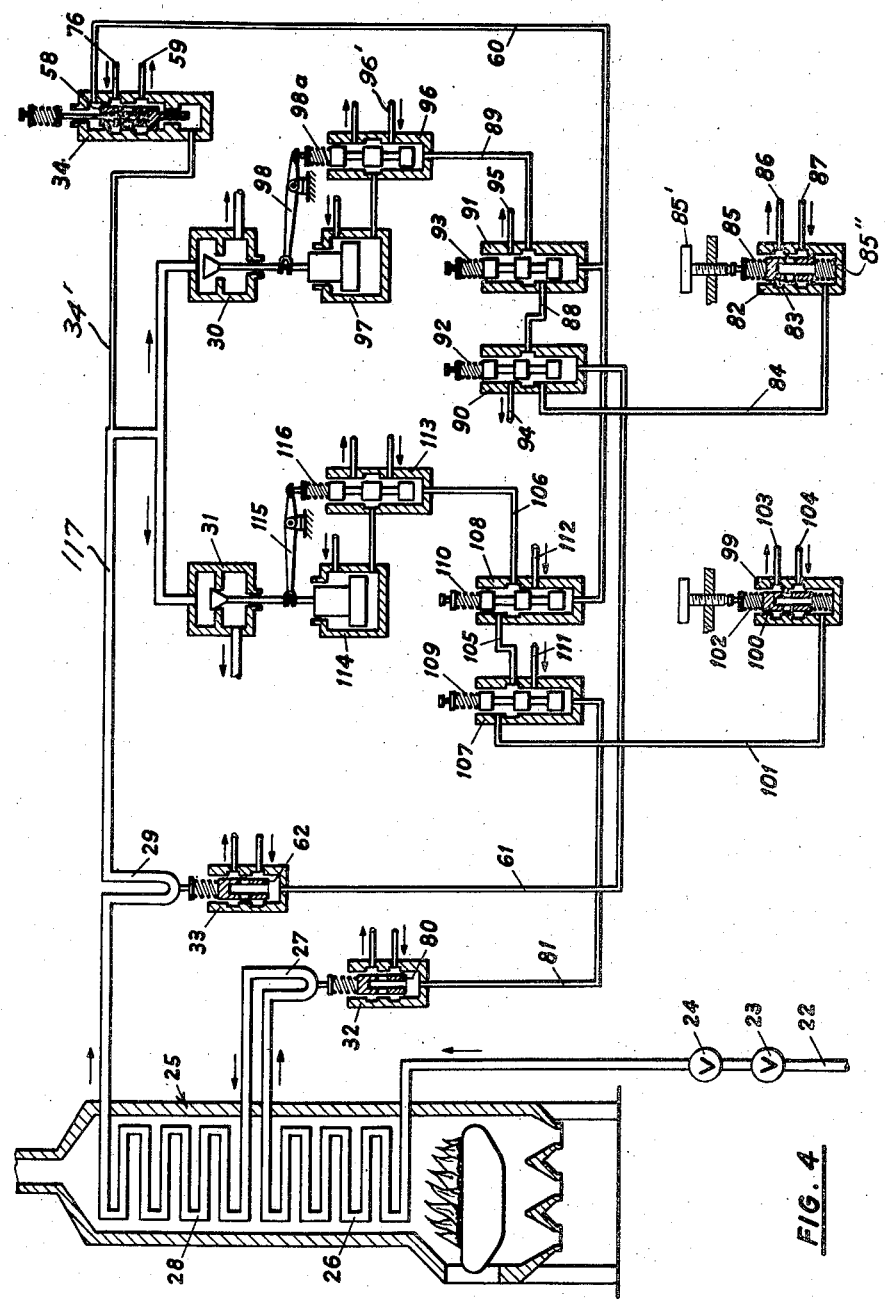
Fig. 4 is a diagrammatic illustration like Fig. 3, showing a modified control mechanism according to the invention.

Fig. 4 illustrates the same part of a steam power plant as shown in Fig. 3. It comprises the same temperature and pressure impulse generators 32, 33, and 34. The organization of the control mechanism for the valves 30 and 31, however, is different, so that the valves 30 and 31, after performing a safety function, are returned to their original positions, which are determined in the control station, as soon as the pressure and/or the temperature of the operating fluid of the plant are again within the desired range.

The first and second control means of the steam valve 30 are formed by a control valve 82 whose piston 83 is adapted to assume either a first operating position affording removal of pressure fluid from a conduit 84 through a relief conduit 86, or a second operating position affording flow of pressure fluid from a supply conduit 87 into the conduit 84, or a neutral or rest position, depending on the pressure in the conduit 84 and the tension of a spring 85 acting on the valve piston 83 against the pressure of the spring 85". Two slide valves 90 and 91 forming the third control means are serially arranged between the sections 84, 88 and 89 of the main control conduit. The valves 90 and 91 either open the control conduit or relieve pressure fluid therefrom through discharge conduits 94 and 95, respectively, depending on the tension of the springs 92 and 93 acting on the valves 90 and 91, respectively, and on the pressure in the impulse-transmitting conduits 61 and 60, respectively, which pressure opposes that of the springs 92 and 93. The pressure in the control conduit acts on the control piston 96 for the servomotor 97 of the steam valve 30. The piston 96 is returned toward its original position by means of a return guide 98 after each regulating action until the fluid pressure in the control conduit 89 acting on the bottom of the valve member 96 balances the pressure of a spring 98a acting on the top of the member 96. In this manner, the position of the steam valve 30 is coordinated with the pressure in the control conduit which is defined by the tension of the spring 85.

During the time the steam generator 25 is started, the tension of the spring 85 is at first released and the steam valve 30 is completely closed. When the steam reaches the desired pressure and temperature, the spring 85 is somewhat tensioned by manipulation of a hand wheel 85', so that the piston valve 83 is moved downward and pressure fluid is fed into the conduit 84 until the piston 83 is returned into its original position by the pressure in the conduit 84. The pressure fluid has moved through the sections 88 and 89 of the control conduit, lifting the valve 96, so that pressure fluid from a supply conduit 96' could flow into the servomotor 97 for somewhat opening the valve 30. By further tensioning of the spring 85 the valve 30 is slowly farther opened. If, for example, due to an excessive steam consumption, the pressure in the steam main 117 drops, the pressure control impulse generator 34 causes the pressure to drop in the conduit 60, so that the piston 91 is pressed downward by the spring 93 and pressure fluid flows through a discharge conduit 95 out of the control conduit section 89 causing closing of the valve 30. If thereupon the steam pressure rises, the piston 91 is moved up by the rising pressure in the conduit 60 against the action of the spring 93 into its normal position, whereby pressure fluid supplied through the conduit 87 can again flow through the main control conduit 84, 88, 89 until the valve 30 is in its original position which is determined by the tension of the spring 85. Farther opening of the valve 30 than determined by the tension of the spring 85 is not possible. In case of steam pressure variations, the valve 30 can not only be closed, as required by the safety function of the valve, but it can also be automatically returned into the position which is determined in the control station. A slide valve 90 acts similarly to the slide valve 91, when the temperature at the thermostat 29 changes. If the temperature is lowered, the valve 30 is closed by the action of the valve 90. If the temperature rises, the valve 30 will be reopened to the position corresponding to the original adjustment of the spring 85.

The by-pass valve 31 is operated similarly to the valve 30. A control valve 99 forming the first and second control means is provided with a valve piston 100 whose position is controlled by the pressure in a section 101 of a main control conduit 101, 105, 106 and by the tension of a spring 102 acting against the aforesaid pressure. The piston 100 may assume a neutral or rest position and two extreme operating positions; in one of the latter the piston connects the control conduit with a relief pipe 103, and in the other operating position the piston 100 connects the control conduit with a pressure fluid supply conduit 104. The third control means includes two control valves 107 and 108 which are serially interposed in the main control conduit, the valve 107 connecting sections 101 and 105 and the valve 108 connecting the sections 105 and 106. The valve 107 responds to the pressure in a temperature impulse conducting conduit 81 which pressure acts against a spring 109 and the valve 108 responds to the pressure in the pressure impulse conducting conduit 60 acting against a spring 110. Depending on their positions, the valves 107 and 108 admit pressure fluid into the main control conduit from pressure fluid supply conduits 111 and 112, respectively. The pressure fluid in the main control conduit acts on a control valve 113 against a spring 116, the valve 113 controlling the flow of pressure fluid to and from a servomotor 114 actuating the valve 31. A return guide 115 returns the piston 113 to its neutral piston, if there is equilibrium between the pressure of the fluid in the control conduit 106 and that of the spring 116 which is interposed between the return guide lever 115 and the piston 113.

The position of the by-pass valve 31 can be determined by adjustment of the tension of the spring 102. Since the safety function of the valve 31 is in a direction opposite to that of the valve 30, the valve 31 opens farther at an undesired change of a physical condition of the steam whose flow is controlled by the flow control means 31 and returns to its original position when the condition is normal again. It is impossible to close the valve 31 by the impulses generated by the devices 32 or 34 farther than is permitted by the tension of the spring 102.

The described arrangements may be combined or modified in many ways to suit particular operating requirements. Depending on local conditions, it may be preferred, without departing from the scope of the invention, to operate the entire control system by electricity, whereby, for example, the servomotors are replaced by electric motors and the control valves are replaced by switches.

What is claimed is:

1. A servomotor control system comprising a servomotor, a main control conduit having one end connected with one end of said servomotor, a pressure fluid supply conduit connected with the other end of said servomotor, a first control means connected with the other end of said control conduit and adapted to send control impulses through said control conduit to said servomotor for actuating said servomotor in one direction, a second control means connected with said control conduit and adapted to send control impulses into said control conduit and said servomotor to permit actuation of said servomotor in the opposite direction, and a third control means interposed in said control conduit between said first control means and said servomotor for inhibiting transmission of control impulses from said first control means through said control conduit and sending control impulses to said servomotor permitting actuation of said servomotor in the opposite direction to the direction in which said servomotor is actuated by said first control means.

2. A servomotor control system as defined in claim 1, in which said first and said second control means are united into a single control device including an adjusting member adapted to be selectively placed into a first operating position for actuating said servomotor in one direction or into a second operating position permitting actuation of said servomotor in the opposite direction or into a neutral position.

3. A servomotor control system as defined in claim 1, in which said second control means is interposed in said control conduit.

4. A servomotor control system as defined in claim 1, comprising an additional control conduit branching from said main control conduit, said second control means being interposed in and controlling said additional control conduit.

5. A servomotor control system as defined in claim 1, in which said second and said third control means are combined to form a single control device having a single adjusting member permitting actuation of said servomotor in the said opposite direction.

6. A servomotor control system as defined in claim 1, in which said third control means is formed by a single device which is adapted to respond to a plurality of different control pulses.

7. A servomotor control system as defined in claim 1, in which said third control means is formed by a plurality of devices which are serially interposed in said main control conduit and which are adapted to individually respond to a different control pulse.

8. A servomotor control system as defined in claim 1, in which said control conduit contains a pressure fluid and said control means are adapted to control the flow of the pressure fluid in said control conduit.

9. A servomotor control system as defined in claim 1, including electric actuating means connected with at least one of said control means for electric actuation thereof.

10. A servomotor control system as defined in claim 1, in which said servomotor is provided with a return guide for holding said servomotor in an adjusted position and in which said first control means includes a piston valve controlling the flow of a pressure fluid into said main control conduit, said piston valve including a piston having one end exposed to the pressure of the pressure fluid in said control conduit, a spring acting on the other end of said piston against the pressure of the pressure fluid, and adjusting means connected with said spring for adjusting the tension thereof and consequently the pressure of said pressure fluid in said control conduit and the position of said servomotor when said third control means is inactive.

References Cited in the file of this patent
UNITED STATES PATENTS
2,635,636   Carson _____ Apr. 21, 1953